Aug. 2, 1949.  C. F. BALL  2,477,682
REINFORCING MEMBER
Filed Aug. 7, 1944

Charles F. Ball INVENTOR.
BY Harold W. Hawkins
ATTORNEYS.

Patented Aug. 2, 1949

2,477,682

UNITED STATES PATENT OFFICE 2,477,682

REINFORCING MEMBER

Charles F. Ball, Franklin, Pa., assignor to Joy Manufacturing Company, a corporation of Pennsylvania Application August 7, 1944, Serial No. 548,459

10 Claims. (Cl. 189—34)

This invention relates to a body trim, and more particularly to a new and novel trim for reenforcing and strengthening the side walls of a material carrying vehicle.

My invention is primarily adapted for use on a material carrying vehicle of the general type disclosed in U. S. Letters Patent No. 2,192,650, granted to John D. Russell on March 5, 1940, and commonly referred to in this art as "shuttle cars."

These cars, which are used principally in underground mining operations, have a conveyor bottom with a side wall which is attached to the chassis along each side thereof, and an opening at one end thereof through which the material is discharged on operation of the conveyor. To protect the side walls of the car against bending on being struck by the sidewise movement of the boom of a loading machine, or by the falling of extremely large lumps of material into the car, reenforcing members are employed to strengthen the upper edges of the side walls of the car. The reenforcing members most commonly used are angles, Z bars, split tubular members and the like, which are welded to the upper edge of the side walls of the car. Such reenforcing members either interfere with the adding of side boards to the car; are difficult and costly to secure to the car; fail to give the proper protection to the side wall; or extend so great a distance from the side wall as to interfere with other parts or functions of the car, and therefore are not entirely satisfactory.

Therefore, the primary object of this invention is to provide a reenforcing member for the side walls of a shuttle car which is easy and inexpensive to attach to the car, will permit the use of side boards without special fitting, will not project any substantial distance from the side wall of the car, and will furnish the maximum degree of stiffness to the side wall.

Another object is to provide a new and novel trim for the side walls of a material carrying vehicle which is adapted to be welded to the top and side of the plate forming the side wall, and which is of such shape that maximum spacing is obtained between the welds, and firmer attachment to the plate is thereby secured.

A still further object is to provide a reenforcing member or trim which is of new and novel shape in section, is easily manufactured, and readily installed on the members desired to be reenforced.

These and other objects which will hereinafter be made apparent to those skilled in this particular art are accomplished by means of this invention, one embodiment of which is described in the following specification and illustrated in the accompanying drawings, wherein.

Figure 1:
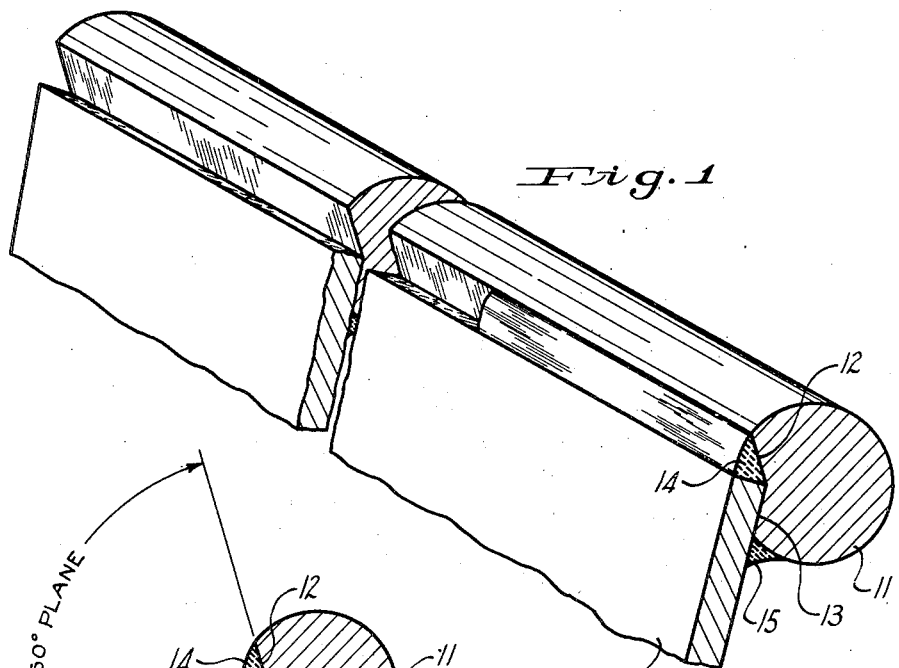
Fig. 1 is a perspective view of my improved body trim attached to a plate representing the side wall of a material carrying vehicle.
Figure 2:
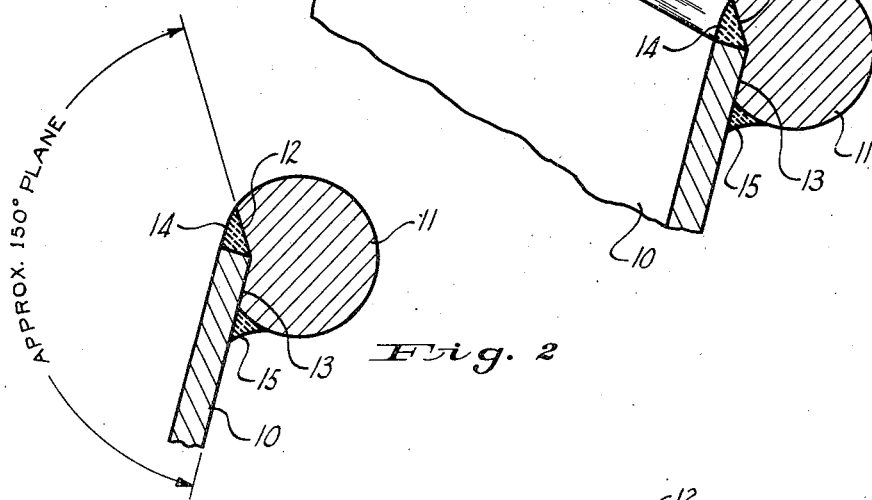
Fig. 2 is a sectional view of the body trim applied to a wall.
Figure 3:
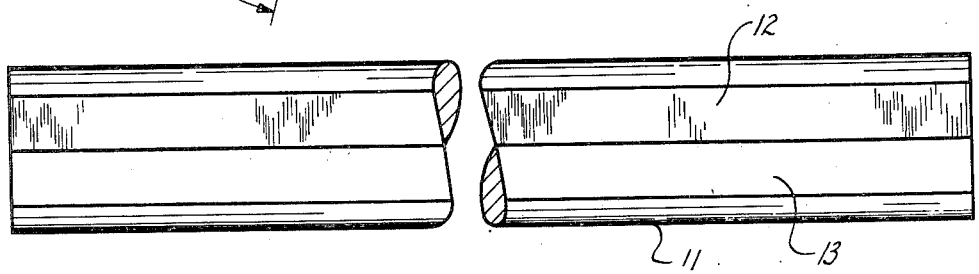
Fig. 3 is a front elevation of my improved body trim.

Referring now to the drawings, 10 represents a wall such as the side wall of a material carrying vehicle, and 11 a member or trim made in accordance with the present invention for reenforcing or strengthening the wall 10.

The reenforcing member 11, which is substantially circular in section, has a V-shaped notch formed in one side and extending longitudinally thereof, to provide faces 12 and 13 of substantially equal width.

The faces 12 and 13 lie in planes intersecting each other on a line parallel to the longitudinal axis of member 11 at an angle of approximately 150° to each other.

In assembling the trim, one of the faces 12 or 13, depending on which side of the wall 10 it is desired to have the added metal, is placed in abutting relation with the side of the wall 10, with the other face, 13 or 12 respectively, extending upwardly and projecting over the top of the wall 10 to provide an angle there between for receiving welding metal 14 for attaching the member 11 to the top of the wall 10. To further attach the member 11 to the plate 10 a weld is run between the side of the wall and the member 11 at the outer end of the face 13 and/or 12.

It should be noted that the faces 12 and 13 are preferably of such width in comparison with the thickness of the wall to which the member 11 is to be attached that when assembled on the wall, the outer free end of the face projecting above the top of the wall will fall within the plane of the wall, and consequently there are no projections on the side of the wall opposite to that to which the metal of the trim was added, and side boards or other members can, if desired, be bolted to this side of the wall without any special fitting.

From the foregoing construction it is apparent that my improved reenforcing member or trim 11 is welded to the wall 10 at two points, i. e., along the top of the wall, and along the bottom edge of the member, and the two are spaced apart by a distance equal to the width of the face 12 or 13, which assures the trim attachment of the member 11 to the wall 10, since the danger of "burning" the wall by having welds on opposite sides or close together is entirely removed.

Further, when my improved reenforcing member or trim is applied to a wall, substantially all of the metal of the trim or member 11 is added to one side of the wall, and as a result, the lateral stiffness and strength of the combined section, i. e., the wall and trim welded together, are substantially increased. Compared to solid round trim centered on the wall, the resultant strength is increased 20% and the stiffness is increased 60%.

The member 11 and the faces 12 and 13 therein may be made by rolling or machining from bar stock or by extrusion, or by any other known method.

While I have illustrated one embodiment of my invention, it is to be understood that certain modifications may be made therein without departing from the spirit of my invention or the scope of the appended claims.

What I claim as new is:

1. A reenforced wall structure comprising, in combination, a wall member, and a reenforcing member extending along an edge of said wall member and comprising a body substantially circular in cross section and provided with a longitudinally extending, generally V-shaped notch, the relatively inclined surfaces of said notch being of substantially equal width, and one of said surfaces abutting against and secured to the outer surface of said wall member.

2. A reenforced wall structure comprising, in combination, a wall member having a top edge, and a reenforcing member extending along the top edge of said wall member and comprising a body of substantially circular cross section, said body having therein a longitudinally extending, generally V-shaped notch, the relatively inclined surfaces of said notch being disposed at an obtuse angle and one of said surfaces abutting against and secured to the outer surface of said wall member and the other surface projecting over the top edge of said wall member.

3. A reenforced wall structure comprising, in combination, a wall member, and a reenforcing member extending along the top of said wall member and comprising a body of substantially circular cross section, said body having a longitudinally extending, generally V-shaped notch therein, the relatively inclined surfaces of said notch being of substantially identical size and shape and one of the same engaging and being secured to the outer surface of said wall member.

4. A reenforced wall structure comprising, in combination, a wall member, and a reenforcing member extending along the top of said wall member and comprising a body of substantially circular cross section, said body having therein a longitudinally extending, generally V-shaped notch, the relatively inclined surfaces of said notch being disposed at an obtuse angle and being of substantially equal width and lying in planes intersecting each other on a line parallel to the longitudinal axis of said body, and one of said surfaces abutting against and secured to the side of said wall member.

5. A reenforced wall structure comprising, in combination, a wall member, and a reenforcing member extending along one edge of said wall member and comprising a body of substantially circular cross section and grooved longitudinally to a depth substantially equal to the thickness of said wall member, one face of the groove abutting and secured to one surface of said wall member with the opposite surface of said wall member extending tangentially with respect to a circle in which the outer periphery of said body lies, and the other face of said groove overlying the top edge of said wall member.

6. A reenforced wall structure comprising, in combination, a wall member and a reenforcing member extending along the top edge of said wall member and comprising a body of substantially circular cross section, said body having a generally V-shaped notch extending along the same, the relatively inclined faces of said notch being disposed at an obtuse angle, one of said faces abutting a surface of said wall member and the other notch surface extending above the top of said wall member, and welding material received in the space provided between said wall member and said other notch surface for integrally uniting said reenforcing member to said wall member.

7. A reenforced wall structure comprising, in combination, a side wall member having a top edge, and a reenforcing member comprising an elongated rod-like body of substantially circular cross section cut away to provide angularly disposed longitudnally extending faces, one of said faces abutting against and secured to one surface of said side wall member to be reenforced, and the other face projecting over said top edge of said side wall member, said faces being of substantially equal width and of such width in relation to the side wall that the face which projects over said top edge of said side wall member lies within the projection of the plane of the opposite surface of said side wall member.

8. A reenforced wall structure comprising, in combination, a side wall member having a top edge, and a reenforcing member comprising an elongated rod-like body of substantially circular cross section cut away to provide angularly disposed longitudinally extending faces, one of said faces abutting against and secured to one surface of said side wall member to be reenforced, and the other face projecting over said top edge of said side wall member, said faces being of substantially equal width and of such width in relation to the side wall and making such an angle with each other that the face which projects over said top edge of said side wall member lies within the projection of the plane of the opposite surface of said side wall member.

9. A reenforced wall structure comprising, in combination, a side wall member having a top edge, and a reenforcing member comprising an elongated rod-like body of substantially circular cross section cut away to provide angularly disposed longitudinally extending faces, one of said faces abutting against and secured to one surface of said side wall member to be reenforced, and the other face projecting over said top edge of said side wall member, said faces being of substantially equal width and the face which projects over said top edge of said side wall member lying wholly between the planes, extended, of the said one surface of said side wall member and the opposite surface of said side wall member.

10. A reenforced wall structure comprising, in combination, a side wall member having a top edge, and a reenforcing member comprising an elongated rod-like body of substantially circular cross section cut away to provide angularly disposed longitudinally extending faces, one of said faces abutting against and secured to one surface of said side wall member to be reenforced, and the other face projecting over said top edge of said side wall member, said latter face being of greater width than the thickness of said side wall member but disposed at such an angle to said one surface of said side wall member that it lies within the projection of the plane of the opposite surface of said side wall member.

CHARLES F. BALL.

REFERENCES CITED

The following references are of record in the file of this patent:

UNITED STATES PATENTS

| Number | Name | Date |
|---|---|---|
| 828,523 | Springer | Aug. 14, 1906 |
| 1,557,136 | Blest | Oct. 13, 1925 |
| 1,790,919 | Heath | Feb. 3, 1931 |

FOREIGN PATENTS

| Number | Country | Date |
|---|---|---|
| 359,664 | Great Britain | Oct. 29, 1931 |
| 451,793 | Germany | Oct. 25, 1927 |

OTHER REFERENCES

"Aluminum Moldings," catalog of Aluminum Co. of America, received in Patent Office February 6, 1930, pages 1 and 21.

The Michigan Copper and Brass Co. Catalog, "Extruded Aluminum Shapes and Mouldings," 1930. Sheet incl. No. 148, 154, 2328 etc.

The Aluminum Co. of America, catalog, "Aluminum Mouldings," 1928, pages 18 and 27.